US012668927B2

(12) United States Patent
Schwaiger et al.

(10) Patent No.: US 12,668,927 B2
(45) Date of Patent: *Jun. 30, 2026

(54) HOT EXTRACTION PAPER

(71) Applicant: Mondi AG, Vienna (AT)

(72) Inventors: Elisabeth Schwaiger, St. Stefan (AT);
Paulus Goess, Klagenfurt (AT)

(73) Assignee: Mondi AG, Vienna (AT)

( * ) Notice: Subject to any disclaimer, the term of this patent is extended or adjusted under 35 U.S.C. 154(b) by 516 days.

This patent is subject to a terminal disclaimer.

(21) Appl. No.: 17/785,624

(22) PCT Filed: Dec. 16, 2020

(86) PCT No.: PCT/EP2020/086469

§ 371 (c)(1),
(2) Date: Jun. 15, 2022

(87) PCT Pub. No.: WO2021/122779

PCT Pub. Date: Jun. 24, 2021

(65) Prior Publication Data

US 2023/0022704 A1      Jan. 26, 2023

(30) Foreign Application Priority Data

Dec. 20, 2019    (EP) ..................................... 19219126

(51) Int. Cl.
D21H 27/08      (2006.01)
B01D 39/18      (2006.01)

(52) U.S. Cl.
CPC ............. *D21H 27/08* (2013.01); *B01D 39/18* (2013.01); *B01D 2239/1258* (2013.01); *B01D 2239/1291* (2013.01)

(58) Field of Classification Search
CPC ......... D21H 27/08; A47J 31/08; B01D 39/18; B01D 2239/1258; B01D 2239/1291

USPC ...................................................... 210/502.1
See application file for complete search history.

(56) References Cited

U.S. PATENT DOCUMENTS 11,939,725 B2 *   3/2024  Schwaiger ............. D21H 27/08

FOREIGN PATENT DOCUMENTS

CN        110452402 A  *  11/2019
EP        0422898          4/1991
EP        1985437          10/2008

OTHER PUBLICATIONS

Liu et al., English machine translation CN 110452402 A, pp. 1-5 (Year: 2019).*
International Search Report.

* cited by examiner

*Primary Examiner* — Claire A Norris
(74) *Attorney, Agent, or Firm* — Dunlap Bennett & Ludwig PLLC

(57)            ABSTRACT

A water vapour-permeable and hot water-resistant paper made substantially of cellulose and of manufacturing additives required for cellulose production, such as pH-value adjusting agents based on acids and/or bases, the paper exclusively contains cellulose with fibre lengths of at least 2.0 mm as a length-weighted mean, in particular of at least 2.5 mm as a length-weighted mean, wherein the cellulose forming the paper is a cellulose ground to a consistency of 30-35% by high-consistency grinding and possibly to a consistency of 4-6% by low-consistency grinding, a proportion of fines in the paper is set at values smaller than 6.5% and the pH value is set in the pseudo-neutral range, in particular at values under 7.5, preferably at values between 6.6 and 7.4, and an elongation of the paper in the machine direction is ≤3%.

10 Claims, No Drawings

HOT EXTRACTION PAPER

BACKGROUND OF THE INVENTION

The present invention relates to a water vapour-permeable and hot water-resistant paper made substantially of cellulose and of manufacturing additives required for cellulose production, such as pH-value adjusting agents based on acids and/or bases, made substantially of cellulose and manufacturing additives which are essential to cellulose production, such as pH-value adjusting agents based on acids and/or bases.

Special water vapour-permeable and hot water-resistant papers which are used as coffee filters, tea filters or for other applications and which are also referred to as hot extraction papers have to satisfy certain requirements, particularly when they are used in the food sector. Not only the raw material used—in this case wood chips or cellulose—but also the additives are precisely standardized and may only be selected from a very small number of specific substances.

The lists of additives in this case differ depending on the chosen application and, in particular, it is necessary that following hot-water extraction, the total dry residue of the extract does not exceed a quantity of 10 mg/dm² and, in particular, additives customarily used in paper production have to be largely dispensed with.

It has emerged in this context that the requirements differ depending on the subsequent application and that papers which are suitable for tea preparation, for example, cannot be used as cook-in bags.

However, apart from traditional coffee and tea filters, a plurality of special papers is also known in the art which can, or may, be used for the production of drinking cups in which hot coffee or hot tea or soup can be sold, for example. Hence, for example, EP 1 985 437 A1 discloses a method with which paper is processed into drinking cups and the like, which paper can be used immediately after its forming in the food sector, for example for hot coffee or hot tea.

Apart from traditional coffee filters, the demand for capsules which contain the coffee for brewing has become ever greater in recent times, since machines which receive capsules of this kind, and can therefore supply coffee or tea, are being used to a greater extent not only on the industrial market, but also in private households. The use of these machines results in an excessively large number of used plastic or metal capsules, or capsules made of both materials, which at the present time are largely disposed of or regarded as special waste. Due to the ever-increasingly prevalent problem of plastic waste which is found in the most inaccessible places, such as in the middle of the ocean, plastic must be disposed of in such a manner that it is recycled and the ever-growing problem is thereby reduced as far as possible. Metal capsules, in particular aluminium capsules, are extremely expensive and their production requires a high energy expenditure, so that there is a need for a new kind of container for coffee machines that use capsules, with which coffee can be brewed using coffee-filled capsules, without the used capsules having to undergo costly processing and without there being a risk to the environment.

EP 0 422 898 A1 discloses an optimized design for a coffee capsule containing two round cut filter papers, one of which can be stretched by at least 3% and the other paper forming a top surface of the capsule is impregnated with a sealant such as polyethylene or polypropylene, in order to make it sealable.

Furthermore, the demand for containers in which pre-prepared foods are contained, such as soup containers, yoghurt pots and the lids thereof, and containers for baking mixes, for example, in which the products are either ready for consumption or can be finished in the packaging itself, is becoming ever-greater. In order to protect the environment, plastic containers, or container lids, are becoming less and less popular and paper containers, in particular, are becoming an ever-more sought-after alternative.

SUMMARY OF THE INVENTION

The aim of the invention is to provide a water vapour-permeable and hot water-resistant paper which is suitable for the production of sachets for hot-extractable, consumable substances such as milk, tea, cocoa, flavourings and the like, and also lids for hot drink containers such as soup containers, tea and coffee capsules and the like, or also containers, lids or packaging for the hot preparation of a wide variety of foods, and which can furthermore also be used directly for the packaging of a wide variety of liquid, creamy or paste-like foods.

In order to solve this problem, the water vapour-permeable and hot water-resistant paper is substantially characterized in that the paper exclusively contains cellulose with fibre lengths of at least 2.0 mm as a length-weighted mean, in particular of at least 2.5 mm as a length-weighted mean, that the cellulose forming the paper is a cellulose ground to a consistency of 30-35% by high-consistency grinding and possibly to a consistency of 4-6% by low-consistency grinding, that a proportion of fines in the paper is set at values smaller than 6.5% and that the pH value is set in the pseudo-neutral range, in particular at values under 7.5, preferably at values between 6.6 and 7.4, and that an elongation of the paper in the machine direction is 3%. By selecting paper which contains cellulose with fibre lengths of at least 2.0 mm in the length-weighted mean, in particular at least 2.5 mm in the length-weighted mean, it is possible to produce a paper with a tensile strength or bursting strength that is substantially higher compared with traditional papers. Furthermore, because the proportion of fines in the water vapour-permeable and hot water-resistant paper is set to be smaller than 6.5%, on the one hand the required air permeability of the paper can be guaranteed and, on the other hand, the pore size of the paper can be selectively adjusted. Adjusting the pH value to the pseudo-neutral range, i.e. to values smaller than 7.5 and preferably to values in the range of 6.6 to 7.4, means that the paper is not only suitable as hot-extraction paper for hot drinks and soups, for example, but it can also be used, for example, for hot-extractable food supplements, or the like, or directly for the production of containers and/or the lids thereof, for liquid, paste-like or creamy foods.

Because the cellulose forming the paper is a cellulose that has undergone high-consistency grinding and possibly low-consistency grinding, it is possible to increase the elongation of the paper substantially in a cross direction compared with that in a longitudinal direction and it can furthermore be ensured that when unbleached cellulose is used, the shives customarily contained therein are removed. According to the invention, the cellulose forming the paper has therefore undergone high-consistency grinding with a consistency of between 30% and 35% and possibly, in addition, low-consistency grinding with a consistency of between 4% and 6%.

Within the framework of this application, when the term "paper" is chosen, this refers to a "water vapour-permeable and hot water-resistant paper" which can be used both as a container or for the constituent parts and lids thereof, in particular for liquid, creamy or semi-solid foods, before, after or during the production thereof, and can also be traditionally used as hot-extraction paper, for example for the preparation of coffee or the like.

For a particularly good, flat-lying paper, which at the same time also has the necessary strength properties, the elongation properties are substantially set in such a manner that a ratio between a strain at break in the machine direction (MD): a strain at break in the cross direction (CD) is no greater than 1:5.5, in particular no greater than 1:4.5.

Furthermore, by limiting the elongation, in particular the strain at break, of the water vapour-permeable and hot water-resistant paper in the machine direction to ≤3% and preferably to values between 1.5% and 3%, it is possible to produce a paper which, despite the relatively large elongation coming from the cellulose fibres in the cross direction of up to 9.5%, guarantees a good flatness and it is therefore suitable for lids or tops of soup containers, coffee capsules, containers for milk products or also as containers for backing mixes and the like, for example. Despite this small elongation in the machine direction, with a paper of this kind it is possible to provide the paper structure necessary for hot extraction, including under pressure, as a result of which a dimensionally stable and durable paper can be formed which does not tear when higher temperatures and pressures are used, or else the fibre structure thereof is not destroyed.

Cellulose with fibre lengths of at least 2.5 mm as a length-weighted mean refers to cellulose with mean fibre lengths of 2.5 mm, wherein deviations from the mean value are as small as possible and are preferably no greater than ±0.8 mm, in particular no greater than ±0.4 mm, and particularly preferably no greater than ±0.2 mm.

By using a cellulose with length-weighted fibre lengths of at least 2.0 mm as the length-weighted mean, in particular 2.5 mm as the length-weighted mean, the proportion of fines made of cellulose fibres with an extremely low fibre length is curbed. With paper of this kind, it is particularly possible for uniform properties to be achieved which are suitable for use as a tops for coffee capsules or the like, for example, at higher pressures, without there being any risk of unwanted fines or ballast materials being carried along into the drink which is thereby being produced. Taking account of the fact that very detailed regulations exist for the production of hot drinks, concerning which constituent parts a water vapour-permeable and hot water-resistant paper may have and, in particular, which amounts of extract from the production additives or additional substances may be contained in the end product, it will be immediately clear to a person skilled in the art that the number of additional substances must be limited, not only on account of legal requirements, but in particular it must be guaranteed that virtually no additives which are not strictly necessary are contained in the paper and, in particular, it is also guaranteed that no impurities originating from the cellulose itself can be carried along into the drink which is thereby produced. Particular attention should also be paid in this case to the fact that the paper is free from aluminium, so that it is permitted for applications which require contact with food.

For a further improvement in the food suitability of the water vapour-permeable and hot water-resistant paper, shive-free, unbleached paper is used. In order to achieve paper that is free from shives, the cellulose forming the paper undergoes high-consistency grinding during the paper production, in particular high-consistency grinding in the range of 130 to 190 kWh/t, preferably roughly 170 kWh/t, which grinding makes it possible for all shives to be removed from the cellulose and at the same time, however, for excessive elongation of the cellulose fibres in the cross direction to be avoided. Shives constitute artefacts in the paper surface and therefore have a disadvantageous effect on subsequent processing. Shives in the paper structure must be avoided both on account of appearance and also of strength. A method for determining the shive content is described in Tappi T275-Somerville Shive Content. The paper in the invention referred to here has a shive fraction of <0.01% with a 0.15 mm slit width measured according to Tappi T275.

Surprisingly, it has been possible to produce a water vapour-permeable and hot water-resistant paper in which the addition of production additives, such as defoamers, deposition inhibitors, starch, fixing agents, gluing agents, fillers or the like, could be dispensed with and which can nevertheless be produced on a modern, high-speed paper machine which exhibits machine speeds of up to 900 m/min, without the machine having to be operated at substantially below the maximum speed. Normally, the machine speed can only be increased through the addition of production additives known from the prior art, which could be avoided through the special choice of ingredients and the digestion and processing thereof.

According to the invention, the water vapour-permeable and hot water-resistant paper is therefore developed so that during its production only inorganic acids and bases, such as sulphuric acid ($H_2SO_4$) and caustic soda (NaOH), are used as pH-value adjusting agents. It is important in this case for the chloride content, in particular, to be kept low, in order to avoid the introduction of readily soluble chloride into the end product during extractions by means of hot water. Likewise, the nitrogen content in the water extract must be limited, since a greater nitrogen content could alter the flavour of the drink produced using the paper, of a baked cake or the like. The content of splittable nitrogen compounds at 220° C., determined photometrically by Kjeldal digestion in accordance with DIN 38406-E5-1:1983-10, is preferably limited to <0.025 mg/g dry material.

According to a development of the invention, the cellulose is selected from cellulose from conifers chosen from the group including fir trees, spruce, pine, larch and Douglas fir. Conifers are known to have high fibre lengths and are, in particular, commonly used in the production of paper which must have a high tensile strength. According to the invention, attempts are made to select a cellulose which is not only length-weighted, but preferably also comes from one and the same type of wood or mixtures of two defined types of wood, such as mixtures of spruce and pine, for example.

According to a development of the invention, the cellulose is selected for the water vapour-permeable and hot water-resistant paper in such a manner that up to 15%, preferably up to 10%, particularly roughly 5%, of the cellulose from conifers is replaced by cellulose from deciduous trees chosen from the group comprising beech, oak, aspen, poplar, acacia, alder, maple, chestnut, tupelo, sycamore, lime and eucalyptus or mixtures of two or more thereof. In order to keep the properties of the paper substantially unchanged, up to 15%, preferably up to 10%, in particular roughly 5%, of the cellulose, can be replaced by cellulose from deciduous woods which has a smaller fibre length than that from conifers. Despite this replacement, it is possible according to the invention, in particular for the strain at break properties of the water vapour-permeable and hot water-resistant paper to be maintained.

Paper of this kind according to the invention may, as this corresponds to a development, exhibit basis weights of between 40 and 100 g/m², preferably 50 to 80 g/m². The basis weight in this case is selected depending on the intended application, such as heating or the pressure to be applied for extraction or else the duration and type of application, and is frequently in the range of roughly 60 to 80 g/m².

So that they are definitely suitable for any requirement for the extraction of food and beverages, according to a development of the invention the water vapour-permeable and hot water-resistant paper is selected in such a manner that a chloride content of a hot water extract from the paper is below 0.7 mg/l and an aluminium content of a hot water extract from the paper is below 0.1 mg/l. In particular, the lowering of the aluminium content coming from additives, as well as the low chloride content, enables the water vapour-permeable and hot water-resistant paper to be used in the food and beverage sector.

So that the desired surface smoothness of a paper of this kind is reliably maintained or achieved, in particular, the water vapour-permeable and hot water-resistant paper is developed so that it is in addition calendered where necessary. The optional step of calendering, in particular by means of a soft nip calender or a long nip calendar, and particularly preferably by means of a shoe calender, allows the surface of the paper to be smoothed without at the same time having too great a detrimental effect on the bursting strength, the elongation properties in the machine direction and the Gurley value. The selection of a shoe length of 50 to 170 mm in the shoe calender, for example, nipping pressures of up to 10 MPa, a surface temperature of the calender roller of up to 280° C., have a positive effect on the desired smoothing behaviour and printability of the water vapour-permeable and hot water-resistant paper. When a soft nip calender or a long nip calender is used and, in particular, a shoe calender, it is advisable to ensure that the line loads of the calender rollers do not exceed values of 350 kN/m, preferably of 250 kN/m, and particularly preferably of 250 kN/m, as a result of which the desired smoothness and printability of the paper can be achieved, in order to avoid excessive paper compression. In the case of a long nip calender and, in particular, a shoe calender, the values for the line loads should not exceed 700 kN/m, preferably 600 kN/m, and particularly preferably 500 Kn/M.

According to a development of the invention, a sulphate-cooked, unbleached cellulose is used for the water vapour-permeable and hot water-resistant paper. The use of unbleached cellulose means that the use of otherwise necessary bleaching agents is avoided, which substantially improves the overall suitability of the paper as a stand-up pouch or lid for hot extraction containers or other vessels in the food and beverage sector and in the food additives sector.

Corresponding to a development of the invention, by adjusting the bending stiffness index in the machine direction to values between 70 to 600 Nm⁶/kg³, in particular 170 to 400 Nm⁶/kg³, and particularly preferably 200 to 280 Nm⁶/kg³, it is thereby guaranteed that the paper has sufficient flexibility, on the one hand, not to tear during use and, on the other hand, the stiffness is sufficient even for the production of standing pouches, for example. The adjustment of the specific tear resistance index is important in this context. Corresponding to a development of the invention, this is substantially the same in the longitudinal and cross direction and lies in the region of 10.0 mN·m²/g to 13.0 mN·m²/g.

Finally, in order to reliably avoid an uptake of water by a water vapour-permeable and hot water-resistant paper of this kind and therefore a dampening of the product contained therein and/or to guarantee a corresponding flavour protection, the invention is developed to ensure the paper has a coated design. In order to ensure that at least one coating to be applied to the paper where necessary effectively adheres to the water vapour-permeable and hot water-resistant paper according to the invention and does not become accidentally detached, according to a development of the invention the surface energy of the paper is adjusted to >33 mJ/m², preferably >35 mJ/m², particularly preferably >38 mJ/m². The surface energy in this case is understood to be the sum of polar and dispersive portions in the paper and in the layers of paper close to the surface. The surface energy was determined using a Krüss measuring instrument; water and diiodine methane were used as the test liquids. The difference between the upper side and the screen side of the paper in terms of surface energies is preferably 3 mJ/m², particularly preferably 2 mJ/m². In this way, it is possible to ensure that both sides of the paper behave equally when a coating is to be applied and the coatings are not accidentally detached on one side, for example. The surface energy of the paper results from the cellulose being used and the production additives which are absolutely essential on the paper machine. Its adjustment is therefore possible through the choice of the cellulose, for example.

A paper coating can be chosen from one of the following methods, for example: laminating, pasting or extrusion-coating or extrusion-pasting, dispersion-coating or metallizing. The coating materials to be used for the formation of coatings of this kind are, except for the metallizing process, mainly plastics which satisfy the requirements laid down under the laws on foodstuffs for hot extraction or hot preparation, as the total composite of paper and coating(s) has to conform to these. Particularly preferable are plastics which are also biodegradable or compostable, such as polylactic acids or polyvinyl alcohols, for example. However, other corresponding materials in each case, such as polyethylene or polypropylene, for example, can also be used. One or both sides of the paper can be coated and a different number and kind of plastics or materials can be used for coating. Corresponding layer thicknesses are to be adapted to the respective materials and other desired barrier properties and are between 5 and 25 μm, in particular 7 to 20 μm, per layer and are no thicker than roughly 50 μm in total.

The water vapour-permeable and hot water-resistant paper is preferably used unbleached, but the use of bleached paper is also possible in principle which, however, due to the bleaching agents to be used in the production process, is less favourable than the use of natural brown paper.

The water vapour-permeable and hot water-resistant paper can preferably be used in a method for producing tops for sealing capsules for tea and/or coffee preparation and/or yoghurt and milk products, or also for the production of free-standing pouches for soup preparation or hot drinks preparation, for example, wherein constituents such as milk powder, tea, chocolate, and the like, which are to be additionally dissolved in hot drinks where necessary, may be contained.

EXAMPLES OF THE INVENTION

The invention is explained in greater detail below with the help of exemplary embodiments. In relation to the measuring variables used for the description of the properties of the products produced, it should be noted that the following standards have been used for their measurement or determination and that these are no longer separately listed below:

| Fibre length, length-weighted | ISO 16065-2:2014 |
| Proportion of fines (fraction 0.05-0.5 mm) | |
| Bursting strength | ISO 2758:2014 |
| Strain at break | ISO 1924-3:2005 |
| Bending stiffness index, 50 mm | ISO 2493-1:2010 |
| Bending length, 15° angle | |
| Tear resistance index | ISO 1974:2012 |
| Grammage | ISO 536:2012 |
| Air permeability according to Gurley | ISO 5636-5:2013 |
| Hot water extraction | ISO 6588-2:2012 |
| Shive content Somerville 0.15 mm slit width | Tappi T275 sp-18 |

Example 1

Production of a First Water Vapour-Permeable and Hot Water-Resistant Paper According to the Invention Unbleached kraft sulphate cellulose produced exclusively from 80% to 81% spruce and 19% to 20% pine wood with a Kappa number of 42 was used to produce the water vapour-permeable and hot water-resistant paper. On a sack paper machine run pseudo-neutrally with a maximum speed >1000 m/min which was particularly operated at 504 m/min for paper production, 98% sulphuric acid was used exclusively to lower and adjust the pH value. The white water occurring has a pH-value of 6.2 to roughly 7.5. Chemicals which are normally used during paper production, such as alum, starch, deposition inhibitors, defoamers, talcum or other sizing agents should not be used and the corresponding adding openings in the plant are closed at least an hour before production of the water vapour-permeable and hot water-resistant paper begins, so that any residual amounts of these materials in the paper being produced can be reliably held back. Likewise, fibre getters are moved to another paper machine or to other reject containers, in order to avoid contamination of the paper with short fibres. This change-over is performed several hours, preferably roughly 3 hours, before the start of production. The paper machine in this case is operated in such a manner that no own rejects, no dry rejects and no edge strips are fed back to the stock again during paper production. These flows are conducted into a so-called intermediate container during production.

The base material undergoes high-consistency grinding followed by low-consistency grinding, wherein in the case of high-consistency grinding the consistency is set at between 30% and 35% and in the case of low-consistency grinding at between 4% and 6%. Furthermore, in the case of high-consistency grinding, the strain in the cross direction and the low-consistency grinding is controlled in accordance with the reaching of porosity (Gurley) for 17-20 secs. In the exemplary embodiment mentioned, the specific grinding loads during high-consistency grinding lie between 160-180 kWh/t and during low-consistency grinding 120-145 kWh/t.

The paper machine is provided with a long screen of a Fourdrinier screen section. The paper is pressed in a press section using two conventional nips and a shoe press at a pressure in the $1^{st}$ nip of 55 kN/m, in the $2^{nd}$ nip of 75 kN/m and in the shoe pressure at a pressure of 500 kN/m. The water vapour-permeable and hot water-resistant paper is dried in a drying section using slalom drying. The drying continues until a target value of 7% residual moisture is reached.

The paper produced in this way has an air permeability (Gurley) of 17 s a bending stiffness index of 207 $Nm^6/kg^3$ a grammage of 61 $g/m^2$ and a strain at break of 1.92% in the machine direction a strain at break of 6.25% in the cross direction In order to test the properties, a hot extract was produced from 2 g of the paper by boiling with return flow using 100 ml water for 1 hour in accordance with the standard ISO 6588-2:2012. The buffer solution/potassium chloride solution specified in the standard was not used.

The fibre material was filtered off and chloride in the filtrate was determined by means of ion chromatography and aluminium ions by means of atomic absorption spectrometry. It was demonstrated that a chloride content of 0.62 mg/l and an aluminium content of 0.079 mg/l could be achieved. A pH value of 6.8 was determined in the filtrate.

The cellulose had a fibre length of 2.47 mm, a proportion of fines (fraction 0.05-0.5 mm) of 6.48% and a shive content of 0.005%.

The surface energy on the upper side was 40 $mJ/m^2$ and on the screen side 42 $mJ/m^2$.

Example 2

Production of a Second Water Vapour-Permeable and Hot Water-Resistant Paper According to the Invention Unbleached kraft sulphate cellulose produced exclusively from 80% to 81% spruce and 19% to 20% pine wood with a Kappa number of 41 was used to produce the water vapour-permeable and hot water-resistant paper. On a sack paper machine run pseudo-neutrally with a maximum speed >1000 m/min which was particularly operated at roughly 504 m/min for paper production, 98% sulphuric acid was used exclusively to lower and adjust the pH value. The white water occurring has a pH value of 6.2 to roughly 7.5. Chemicals which are normally used in paper production, such as alum, starch, deposition inhibitors, defoamers, talcum or sizing agents should not be used and the corresponding adding openings in the plant are closed at least one hour before paper production begins, so that any residual amounts of these materials in the paper being produced can be reliably held back. Likewise, fibre getters are moved to another paper machine or to other reject containers, in order to avoid contamination of the water vapour-permeable and hot water-resistant paper with short fibres. This changeover is performed several hours, preferably roughly 3 hours, before the start of production. The paper machine in this case is operated in such a manner that no own rejects, no dry rejects and no edge strips are fed back to the stock again during paper production. These flows are conducted into a so-called intermediate container during production.

The base material undergoes high-consistency grinding followed by low-consistency grinding, wherein in the case of high-consistency grinding the consistency is set at between 30% and 35% and in the case of low-consistency grinding at between 4% and 6%. Furthermore, in the case of high-consistency grinding, the strain in the cross direction and the low-consistency grinding is controlled in accordance with the reaching of porosity (Gurley) for 17 to 20 secs. In the exemplary embodiment mentioned, the specific grinding loads during high-consistency grinding are between 160 and 180 kWh/t and during low-consistency grinding 120 to 145 kWh/t.

The paper machine is provided with a long screen, in particular a Fourdrinier screen section. The paper is pressed in a press section using two conventional nips and a shoe press at a pressure in the 1$^{st}$ nip of 55 kN/m, in the 2$^{nd}$ nip of 75 kN/m and in the shoe press at a pressure of 500 kN/m. The water vapour-permeable and hot water-resistant paper is dried in a drying section using slalom drying. The drying continues until a target value of 7% residual moisture is reached.

The paper produced in this way has an air permeability (Gurley) of 15.1 s a bending stiffness index of 237 Nm$^6$/kg$^3$ a grammage of 65 g/m$^2$ and a strain at break of 1.77% in the machine direction a strain at break of 7.69% in the cross direction In order to test the properties, a hot extract was produced from 2 g of the paper by boiling with return flow using 100 ml water for 1 hour in accordance with the standard ISO 6588-2:2012. The buffer solution/potassium chloride solution specified in the standard was not used.

The fibre material was filtered off and chloride in the filtrate was determined by means of ion chromatography and aluminium ions by means of atomic absorption spectrometry. It was demonstrated that a chloride content of 0.66 mg/l and an aluminium content of 0.052 mg/l could be achieved. A pH value of 6.7 was determined in the filtrate.

The cellulose had a fibre length of 2.62 mm, a proportion of fines (fraction 0.05-0.5 mm) of 5.19% and a shive content of 0.005%.

The surface energy on the upper side was 39 mJ/m$^2$ and on the screen side 41 mJ/m$^2$.

Example 3

Production of a Third Water Vapour-Permeable and Hot Water-Resistant Paper According to the Invention Bleached kraft sulphate cellulose produced from 56% to 60% spruce and 25% to 29% pine wood and 15% birch with a Kappa number <5 was used to produce the water vapour-permeable and hot water-resistant paper. On a sack paper machine run pseudo-neutrally with a maximum speed of roughly 900 m/min which was particularly operated at 620 m/min for paper production, 98% sulphuric acid was used exclusively to lower and adjust the pH value. The white water occurring has a pH value of 6.7 to roughly 6.9. Chemicals which are normally used in paper production, such as alum, starch, deposition inhibitors, defoamers, talcum or sizing agents should not be used and the corresponding adding openings in the plant are closed at least one hour before paper production begins, so that any residual amounts of these materials in the paper being produced can be reliably held back. Likewise, fibre getters are moved to other reject containers, in order to avoid contamination of the paper with short fibres. This changeover is performed several hours, preferably roughly 3 hours, before the start of production. The paper machine in this case is operated in such a manner that no own rejects, no dry rejects and no edge strips are fed back to the stock again during paper production. These flows are conducted into a so-called intermediate container during production.

The base material undergoes high-consistency grinding followed by low-consistency grinding, wherein in the case of high-consistency grinding the consistency is set at between 30% and 35% and in the case of low-consistency grinding at between 4% and 6%. Furthermore, in the case of high-consistency grinding, the strain in the cross direction and the low-consistency grinding is controlled in accordance with the reaching of porosity (Gurley) for 17-20 s. In the exemplary embodiment mentioned, the specific grinding loads during high-consistency grinding are between 70-80 kWh/t and during low-consistency grinding 40-50 kWh/t.

The paper machine is provided with a long screen, in particular a Fourdrinier screen section. The paper is produced in a press section using three nips and pressed in the 1$^{st}$ nip at 60 kN/m, in the 2$^{nd}$ nip at 90 kN/m and in the 3$^{rd}$ nip at 95 kN/m. The paper is dried in a drying section using slalom drying. The drying continues until a target value of 7% residual moisture is reached.

The paper produced in this way has an air permeability (Gurley) of 19.2 s a bending stiffness index of 83 Nm$^6$/kg$^3$ a grammage of 100 g/m$^2$ and a strain at break of 2.12% in the machine direction a strain at break of 7.83% in the cross direction In order to test the properties, a hot extract was produced from 2 g of the paper by boiling with return flow using 100 ml water for 1 hour in accordance with the standard ISO 6588-2:2012. The buffer solution/potassium chloride solution specified in the standard was not used.

The fibre material was filtered off and chloride in the filtrate was determined by means of ion chromatography and aluminium ions by means of atomic absorption spectrometry. It was demonstrated that a chloride content of 0.69 mg/l and an aluminium content of 0.038 mg/l could be achieved. A pH value of 6.8 was determined in the filtrate.

The fibre material had a fibre length of 2.33 mm, a proportion of fines (fraction 0.05-0.5 mm) of 6.24% and a shive content of 0.001%.

The surface energy on the upper side was 44 mJ/m$^2$ and on the screen side 46 mJ/m$^2$.

Example 4

Production of a Fourth Water Vapour-Permeable and Hot Water-Resistant Paper According to the Invention Unbleached kraft sulphate cellulose produced exclusively from 80% to 81% spruce and 19% to 20% pine wood with a Kappa number of 44 was used to produce the water vapour-permeable and hot water-resistant paper. On a sack paper machine run pseudo-neutrally with a maximum speed of roughly 900 m/min which was particularly operated at 605 m/min for paper production, 98% sulphuric acid was used exclusively to lower and adjust the pH value. The white water occurring has a pH value of 6.6 to roughly 7.1. Chemicals which are normally used in paper production, such as alum, starch, deposition inhibitors, defoamers, talcum or sizing agents should not be used and the corresponding adding openings in the plant are closed at least one hour before paper production begins, so that any residual amounts of these materials in the paper being produced can be reliably held back. Likewise, fibre getters are moved to another paper machine or to other reject containers, in order to avoid contamination of the paper with short fibres. This changeover is performed several hours, preferably roughly 3 hours, before the start of production. The paper machine in this case is operated in such a manner that no own rejects, no dry rejects and no edge strips are fed back to the stock again during production of the water vapour-permeable and hot water-resistant paper. These flows are conducted into a so-called intermediate container during production.

The base material undergoes high-consistency grinding followed by low-consistency grinding, wherein in the case of high-consistency grinding the consistency is set at between 30% and 35% and in the case of low-consistency grinding at between 4% and 6%. Furthermore, in the case of high-consistency grinding, the strain in the cross direction and the low-consistency grinding is controlled in accordance with the reaching of porosity (Gurley) for 17 to 20 secs. In the exemplary embodiment mentioned, the specific grinding loads during high-consistency grinding are between 170 and 190 kWh/t and during low-consistency grinding 90-120 kWh/t.

The paper machine is provided with a long screen, in particular a Fourdrinier screen section. The paper is produced in a press section using three nips and pressed in the $1^{st}$ nip at 70 kN/m, in the $2^{nd}$ nip at 90 kN/m and in the $3^{rd}$ nip at 105 kN/m.

The paper is dried in a drying section using slalom drying. The drying continues until a target value of 7% residual moisture is reached.

The paper produced in this way had an
air permeability (Gurley) of 18.7 s
a bending stiffness index of 422 $Nm^6/kg^3$
a grammage of 40 $g/m^2$ and
a strain at break of 2.28% in the machine direction
a strain at break of 8.21% in the cross direction In order to test the properties, a hot extract was produced from 2 g of the paper by boiling with return flow using 100 ml water for 1 hour in accordance with the standard ISO 6588-2:2012. The buffer solution/potassium chloride solution specified in the standard was not used.

The fibre material was filtered off and chloride in the filtrate was determined by means of ion chromatography and aluminium ions by means of atomic absorption spectrometry. It was demonstrated that a chloride content of 0.59 mg/l and an aluminium content of 0.071 mg/l could be achieved. A pH value of 6.7 was determined in the filtrate.

The fibre material had a fibre length of 2.51 mm, a proportion of fines (fraction 0.05-0.5 mm) of 5.45% and a shive content of 0.005%.

The surface energy on the upper side was 37 $mJ/m^2$ and on the screen side 39 $mJ/m^2$.

The invention claimed is:

1. A water vapour-permeable and hot water-resistant paper made substantially of cellulose and of manufacturing additives required for cellulose production, consisting of pH-value adjusting agents based on acids and/or bases, the paper exclusively contains cellulose with fibre lengths of at least 2.0 mm as a length-weighted mean as defined in ISO 16065-2:2014, the cellulose forming the paper is a cellulose ground to a consistency of 30-35% by high-consistency grinding or to a consistency of 4-6% by low-consistency grinding, a proportion of fines consisting of cellulose fibres in the paper is at values smaller than 6.5% and the pH value is in the pseudo-neutral range at values between 6.6 to 7.4, and elongation of the paper in the machine direction is ≤3%.

2. The paper according to claim 1, wherein a ratio between a strain at break in the machine direction (MD) a strain at break in the cross direction (CD) is no greater than 1:5.5.

3. The paper according to claim 1, wherein the cellulose is selected from cellulose from conifers chosen from the group consisting of fir trees, spruce, pine, larch and Douglas fir or mixtures of two or more thereof.

4. The paper according to claim 3, wherein up to 15% of the cellulose from conifers is replaced by cellulose from deciduous trees chosen from the group consisting beech, oak, aspen, poplar, acacia, alder, maple, chestnut, tupelo, sycamore, lime and eucalyptus or mixtures of two or more thereof.

5. The paper according to claim 1, wherein the paper has a basis weight of between 40 and 100 $g/m^2$.

6. The paper according to claim 1, wherein the paper has an air permeability according to Gurley of between 15 s and 25 s.

7. The paper according to claim 1, wherein a chloride content of a water extract from the paper is below 0.7 mg/l and an aluminium content of a water extract from the paper is below 0.1 mg/l.

8. The paper according to claim 1, wherein the paper has a bending stiffness index in the machine direction of 70 to 600 $Nm^6/kg^3$.

9. The paper according to claim 1, wherein the paper is calendered in a soft nip calender or a long nip calender.

10. The paper according to claim 1 wherein the surface energy of the paper is adjusted to >33 $mJ/m^2$.

* * * * *